(12) United States Patent
Shibuya et al.

(10) Patent No.: US 8,837,122 B2
(45) Date of Patent: Sep. 16, 2014

(54) FRONT PANEL APPARATUS

(75) Inventors: Yasushi Shibuya, Iwaki (JP); Masahi Endo, Iwaki (JP); Kiminori Yabuki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 469 days.

(21) Appl. No.: 13/086,788

(22) Filed: Apr. 14, 2011

(65) Prior Publication Data

US 2011/0292577 A1    Dec. 1, 2011

(30) Foreign Application Priority Data

May 25, 2010    (JP) ................................. 2010-119537

(51) Int. Cl.
| | | |
|---|---|---|
| *H05K 5/00* | (2006.01) |
| *H05K 7/16* | (2006.01) |
| *G09G 3/36* | (2006.01) |
| *A47B 95/02* | (2006.01) |
| *G02F 1/1333* | (2006.01) |
| *G05G 11/00* | (2006.01) |
| *H04N 7/18* | (2006.01) |

(52) U.S. Cl.
USPC ...... 361/679.01; 361/724; 361/727; 345/905; 345/87; 312/319.2; 312/319.6; 312/319.7; 349/58; 74/479.01; 348/148

(58) Field of Classification Search
USPC ............. 361/679.01–679.45, 679.55–679.59, 361/724–727; 345/905, 87; 248/917–920; 349/58; 312/223.1, 223.2, 319.2, 312/319.6, 319.7, 319.8; 348/148; 74/479.01
See application file for complete search history.

(56) References Cited

U.S. PATENT DOCUMENTS 5,762,412 A *  6/1998  Kim ........................... 312/319.2
5,847,685 A * 12/1998  Otsuki ............................ 345/87

(Continued)

FOREIGN PATENT DOCUMENTS

JP      04-265081       9/1992
JP      2000-076838    3/2000

(Continued)

OTHER PUBLICATIONS

Office Action dated Feb. 25, 2014 for Japanese Patent Application No. 2010-119537, 7 pgs. Including English translation.

*Primary Examiner* — Nidhi Desai
(74) *Attorney, Agent, or Firm* — Brinks Gilson & Lione (57) ABSTRACT

A front panel apparatus improves aesthetic qualities while avoiding interference between a display panel and a surrounding member. The front panel apparatus includes a display panel capable of pivoting in opening and closing directions, power transmission mechanisms that operate in tandem with the opening and closing operations of the display panel, and a lock mechanism that locks the display panel in a closed state and unlocks the display panel. Each power transmission mechanism includes a biasing lever linked to the rear surface of the display panel and capable of advancing and withdrawing, a driving gear, a pivot lever provided on a driving gear and linked to the biasing lever, an intermediate gear that interlocks with the driving gear, and a rack member that interlocks with the intermediate gear and is capable of ascending and descending. The rack members support corresponding pivot support shafts of the display panel. When the driving gears rotate in tandem with the opening and closing operations of the display panel, the intermediate gears rotate and drive the rack members, and the pivot support shafts ascend and descend as a result.

12 Claims, 5 Drawing Sheets

(56) References Cited

U.S. PATENT DOCUMENTS

| | | | | |
|---|---|---|---|---|
| 5,982,637 | A * | 11/1999 | Noguchi | 361/814 |
| 6,012,785 | A * | 1/2000 | Kawasaki | 312/29 |
| 6,682,157 | B2 * | 1/2004 | Ito | 312/319.6 |
| 6,747,364 | B1 * | 6/2004 | Shibuya et al. | 307/9.1 |
| 7,127,728 | B2 * | 10/2006 | Kim et al. | 720/655 |
| 7,134,877 | B2 * | 11/2006 | Matumoto et al. | 434/379 |
| 7,693,390 | B2 * | 4/2010 | Kim | 386/241 |
| 7,724,505 | B2 * | 5/2010 | Chigasaki et al. | 361/679.01 |
| 2002/0001049 | A1 * | 1/2002 | Endo et al. | 349/58 |
| 2002/0101117 | A1 * | 8/2002 | Shibuya | 307/9.1 |
| 2007/0015487 | A1 * | 1/2007 | Chigasaki et al. | 455/346 |

FOREIGN PATENT DOCUMENTS

| | | |
|---|---|---|
| JP | 2002-104088 | 4/2002 |
| JP | 2004-110923 | 4/2004 |
| JP | 2006-273029 | 10/2006 |

* cited by examiner

FRONT PANEL APPARATUS

BACKGROUND OF THE INVENTION

1. Related Application

The present application claims priority to Japanese Patent Application Number 2010-119537, filed May 25, 2010, the entirety of which is hereby incorporated by reference.

2. Field of the Invention

The present invention relates to a front panel apparatus that includes an openable/closable display panel.

3. Description of the Related Art

Automobile audio devices and the like often employ front panel apparatuses that includes a display panel provided with a display screen such as a liquid-crystal display device (LCD) on the front surface of a main body of the audio device that is adapted to expose a media slot or the like, which is normally covered by the display panel, only when necessary. With this type of front panel apparatus, the display panel, called a movable face, is capable of pivoting between a fully-closed state and a fully-open state, and the display panel is normally kept in the fully-closed state, in an upright attitude, so that images can be viewed on the display screen. When the media slot or the like that is covered by the display panel is to be exposed, the display panel is pivoted in the opening direction using the driving force of a motor or the like.

Two conventional types of such a front panel apparatus are known: one in which pivot support points are provided on the left and right sides of the lower end of the display panel, and one in which pivot support points are provided on the left and right sides of the upper end of the display panel. In the case where the pivot support points are provided on the lower end of the display panel, when the display panel opens, it pivots downward so that the upper end of the display panel falls forward, whereas, when the display panel closes, it pivots upward so that the display panel that has fallen forward stands upright (for example, see Japanese Published Application No. 2006-273029A). Conversely, in the case where the pivot support points are provided on the upper end of the display panel, when the display panel opens, it pivots upward so that the lower end of the display panel protrudes outward, whereas, when the open display panel closes, it pivots downward (for example, see Japanese Published Application No. 1992(H4)-265081A). In either case, the display panel is a member having a thickness that corresponds to the liquid-crystal display device and other components contained therein, and thus there is the possibility that, if the display panel is pivoted while the pivot support points thereof are anchored, the end on the side of the pivot support points will interfere with a surrounding member that surrounds the display panel.

For this reason, interference with the surrounding member, which is a concern when the display panel opens or closes, is commonly avoided by providing a comparatively wide gap between the end of the display panel on the pivot support point side and the surrounding member adjacent thereto. For example, if a bevel-shaped area is provided on the end of the display panel on the pivot support points side, the surrounding member adjacent thereto, or both, a concave gap that is wide on the front side of the display panel and surrounding member and narrow on the rear side of the display panel and surrounding member can be formed. This wide gap makes it possible to avoid interference between the display panel and the surrounding member.

However, there is a problem in that if a wide gap between the end of the display panel on the pivot support point side and the surrounding member adjacent thereto is exposed as described above, that gap is visible as an unnatural concave portion, which detracts from the appearance. In particular, when used for automotive purposes, the front panel apparatus may be installed in the instrument panel or the like located below an occupant's line of sight, and in the case where the pivot support points of the display panel are provided on the upper end, the wide gap present between the surrounding member, such as the instrument panel or the like, and the upper end of the display panel will be easily visible to the occupant from diagonally above. This significantly detracts from the aesthetic qualities of the car's interior décor.

The present invention addresses such problems with the conventional techniques, and it is an object of the present invention to provide a front panel apparatus capable of improving aesthetic qualities while avoiding interference between a display panel and a surrounding member.

SUMMARY

In order to achieve the aforementioned object, a front panel apparatus according to an embodiment of the present invention includes a display panel capable of pivoting in opening and closing directions; biasing levers that advance and recede in tandem with opening and closing operations of the display panel; driving gears that rotate in tandem with the advancing and receding of the biasing levers; intermediate gears that rotate by interlocking with the corresponding driving gears; and support point ascending/descending members that support corresponding pivot support points of the display panel so as to be capable of ascending and descending, wherein the support point ascending/descending members are linked to the corresponding intermediate gears, the driving gears rotate in tandem with the opening and closing operations of the display panel, and the intermediate gears rotate in tandem with the driving gears, and thus the intermediate gears drive the support point ascending/descending members, thereby causing the pivot support points to ascend and descend.

According to the front panel apparatus configured in this manner, the rotation of the driving gears in one direction and the advancement of the biasing levers can be carried out in tandem with the opening of the display panel, and the intermediate gears, which are rotationally driven by the driving gears, drive the support point ascending/descending members, thereby making it possible to cause the pivot support points (pivot support shafts) of the display panel to descend or ascend in a desired direction; accordingly, there is no risk of the end of the display panel on the side of the pivot support points interfering with the surrounding member adjacent thereto when the display panel opens. In other words, in the case where the pivot support points are provided on the upper end of the display panel, the upper end of the display panel can be caused to separate from the surrounding member adjacent thereto by the support point ascending/descending members causing the pivot support points to descend in tandem with the opening of the display panel. On the other hand, in the case where the pivot support points are provided on the lower end of the display panel, the lower end of the display panel can be caused to separate from the surrounding member adjacent thereto by the support point ascending/descending members causing the pivot support points to ascend in tandem with the opening of the display panel.

Furthermore, when the open display panel is manually pivoted in the closing direction, the biasing levers recede and the driving gears rotate in the other direction in tandem with the closing of the display panel, and the intermediate gears, which are rotationally driven by the driving gears, drive the support point ascending/descending members, thereby making it possible to cause the pivot support points of the display panel to ascend or descend in the direction opposite to the stated desired direction; accordingly, there is no risk of the end of the display panel on the side of the pivot support points interfering with the surrounding member adjacent thereto when the display panel returns to its original closed state. Accordingly, it is possible to set the gap between the end of the display panel on the side of the pivot support points and the surrounding member to be narrow when the display panel is in a closed state, which makes it possible to prevent the aesthetic qualities from suffering due to a wide gap. Furthermore, the opening and closing operations of the display panel do not require a motor, and thus power transmission mechanisms are not complicated; this makes it possible to realize the front panel apparatus at a low cost.

In the aforementioned configuration, spring members that elastically bias the corresponding biasing levers in the forward direction, and a lock mechanism that locks the display panel in a closed state against the forward force of the biasing levers and unlocks the display panel may be provided. In this case, unlocking the lock mechanism can cause the display panel to pivot in the opening direction due to the biasing force of the spring members. Accordingly, the display panel can be opened automatically, rather than manually, even with a low-cost configuration that lacks a motor, and thus improved operability can be realized in the front panel apparatus. In this case, if a pivot lever is provided for each of the driving gears, and ends of the biasing levers on the side opposite to the display panel are linked to the corresponding pivot levers in a rotatable state, the rotation of the driving gears and the advancing and receding of the biasing levers can be linked without increasing the diameter of the driving gears, which makes it easy to achieve a smaller size for the front panel apparatus.

Furthermore, in the aforementioned configuration, if the support point ascending/descending members are rack members capable of ascending and descending by interlocking with the corresponding intermediate gears, and the rack members are linked to the corresponding pivot support points of the display panel, the rack members can be caused to ascend or descend with precision in tandem with the rotation of the intermediate gears, which makes it easy to cause the pivot support points to ascend or descend along desired paths in tandem with the opening and closing operations of the display panel.

Furthermore, in the aforementioned configuration, if the support point ascending/descending members are pivoting levers that are integrated with the corresponding intermediate gears and are capable of pivoting, and ends of the pivoting levers on the opposite side as the intermediate gears are linked to the corresponding pivot support points of the display panel, the pivot support points of the display panel can be caused to ascend or descend by the pivoting of the pivoting levers in tandem with the rotation of the intermediate gears; this makes it possible to reduce the number of components in the front panel apparatus and simplify the structure of the front panel apparatus.

According to the front panel apparatus of the present invention, the rotation of the driving gears in one direction and the advancement of the biasing levers can be carried out in tandem with the opening of the display panel, and the intermediate gears, which are rotationally driven by the driving gears, drive the support point ascending/descending members, thereby making it possible to cause the pivot support points of the display panel to descend or ascend in a desired direction; accordingly, there is no risk of the end of the display panel on the side of the pivot support points interfering with the surrounding member adjacent thereto when the display panel opens. Furthermore, there is no risk of the end of the display panel on the side of the pivot support points interfering with the surrounding member adjacent thereto when the display panel returns to the original closed state. Accordingly, the gap between the end of the display panel on the side of the pivot support points and the surrounding member can be set to be narrow when the display panel is in a closed state, which eliminates the diminishing of the external appearance caused by widening the gap to an unnatural extent; furthermore, the design of the surrounding member adjacent to the display panel (for example, the instrument panel or the like) is not restricted. Furthermore, the opening and closing operations of the display panel do not require a motor, and thus the power transmission mechanisms are not complicated; this makes it possible to realize the front panel apparatus at a low cost.

DESCRIPTION OF THE PREFERRED EMBODIMENTS

Hereinafter, embodiments of the present invention will be described with reference to the drawings. First, a front panel apparatus according to a first embodiment of the present invention will be described with reference to FIGS. 1 through 4. A front panel apparatus 1 illustrated in FIGS. 1 through 4 is installed and used in a bay provided in an instrument panel of a car passenger compartment, and as shown in FIG. 2, a storage area 3 can be exposed by opening a display panel 2 of the front panel apparatus 1. A main apparatus of an audio device or the like (not shown), for example, can be installed in this storage area 3, or the storage area 3 can be used simply as a storage space. A surrounding member 20 that surrounds the display panel 2 is a member that functions as an external facing, an escathion, or the like of the front panel apparatus 1, and the surrounding member 20 is exposed as a part of the external surface of the instrument panel. Multiple operational component attachment portions 21 may be provided in the surrounding member 20 below an installation space for the display panel 2, and operational components such as operational knobs (not shown) may be installed in these operational component attachment portions 21.

The front panel apparatus 1 primarily includes: the display panel 2, which can pivot in opening and closing directions; power transmission mechanisms 4 that operate in tandem with the opening and closing operations of the display panel 2; a chassis 5 that supports the display panel 2 and the power transmission mechanisms 4; and a lock mechanism 6 capable of holding the display panel 2 in a fully-closed state. Although the power transmission mechanisms 4 are provided on the left and right sides of the storage area 3, the power transmission mechanisms 4 have essentially the same structure, and thus only one of the power transmission mechanisms 4 will be described.

Figure 1:
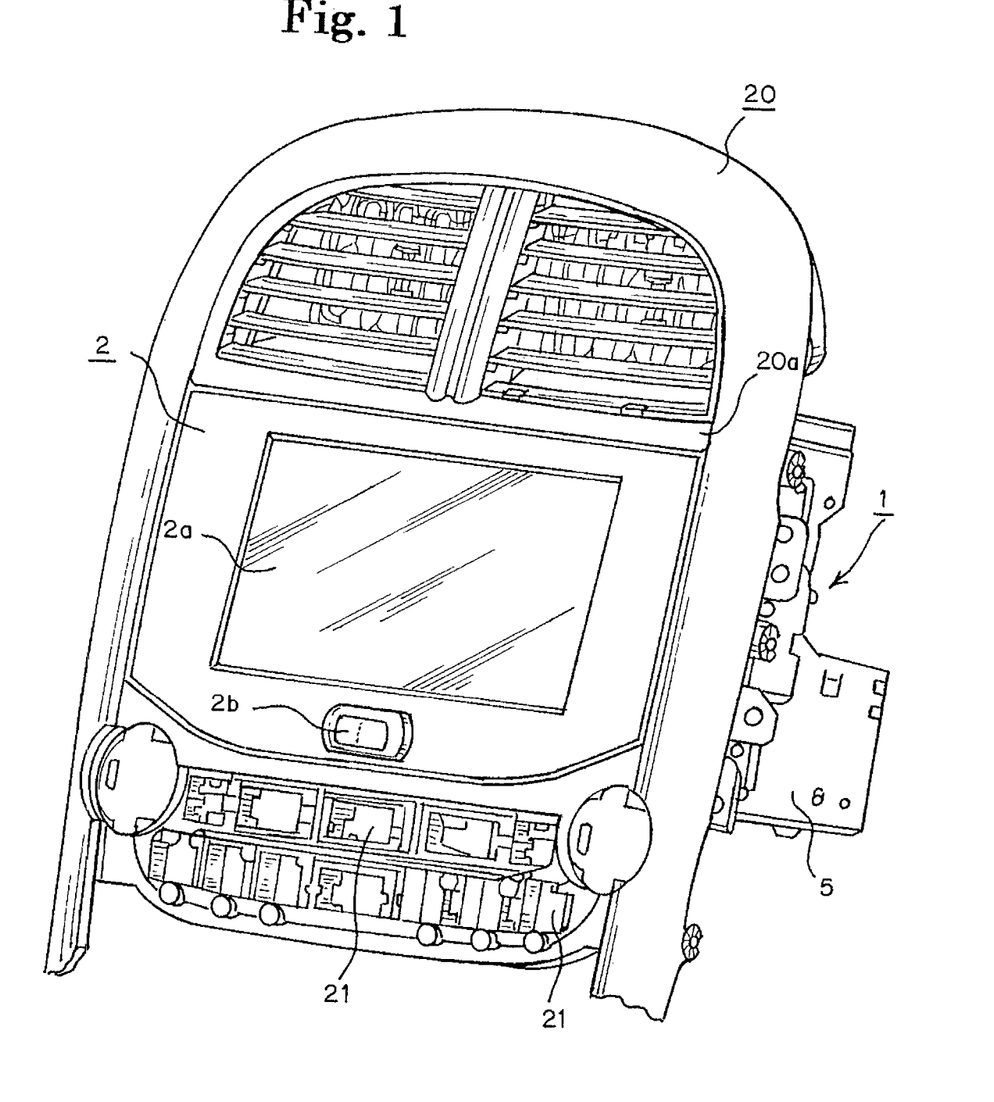
FIG. 1 is an outside view of a front panel apparatus according to a first embodiment of the present invention, illustrating a state in which a display panel is closed.
Figure 2:
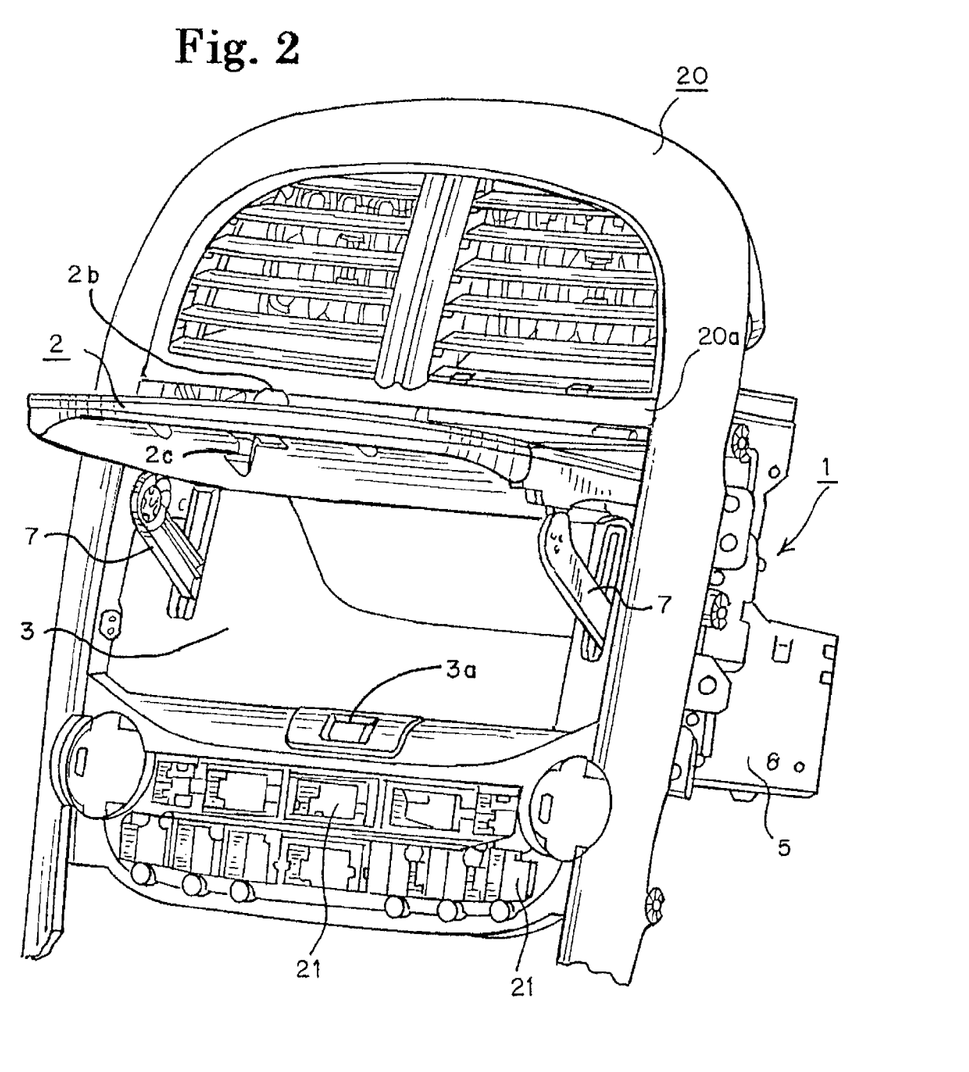
FIG. 2 is an outside view illustrating a state in which the display panel shown in FIG. 1 is open.

As shown in FIG. 1, a liquid-crystal display device (LCD) 5 is installed in the display panel 2, and a display screen 2a of the liquid-crystal display device is exposed in the central area of the display panel 2. Furthermore, a pushable operational button 2b is provided near the center of the lower area of the display panel 2, and the operational button 2b is elastically biased in the outward direction by a spring member (not shown). A locking hook 2c is provided on the rear surface side of the operational button 2b, and a locking cavity 3a with which the locking hook 2c can interlock is provided in the lower edge of the opening of the storage area 3. When the locking hook 2c is pushed into the locking cavity 3a due to the closing of the display panel 2, the locking hook 2c latches with the locking cavity 3a and locks the display panel 2 in a closed state; however, when the operational button 2b is pushed by a user in this state, the locking hook 2c separates from the locking cavity 3a and the display panel 2 unlocks.

Figure 3:
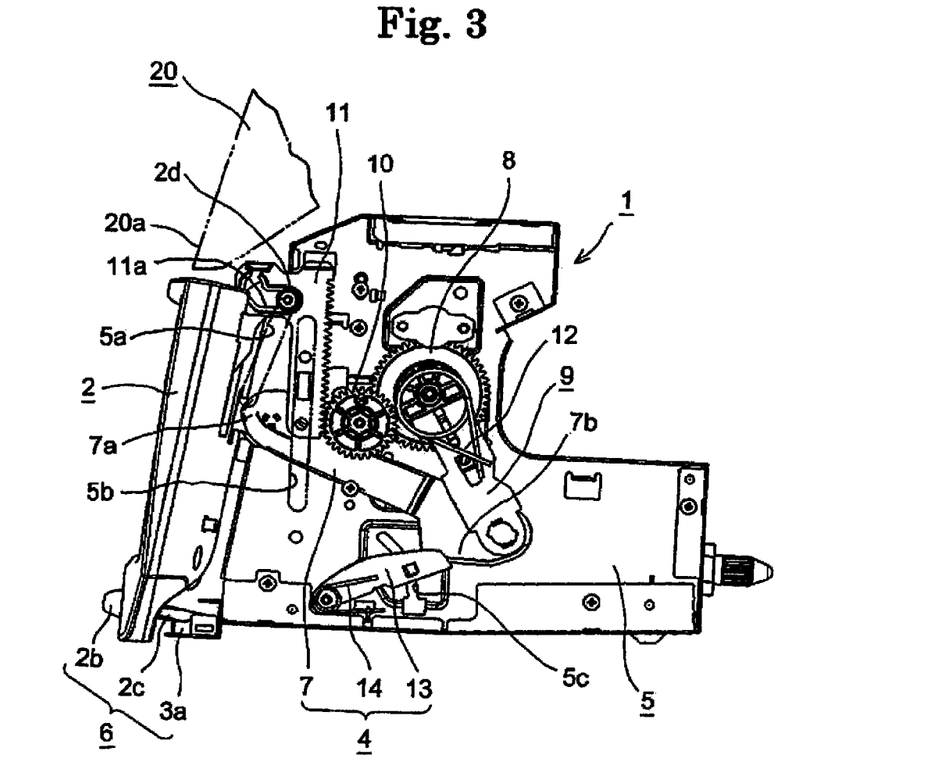
FIG. 3 is a diagram illustrating the internal structure of the front panel apparatus shown in FIG. 1 when in a fully-closed state.
Figure 4:
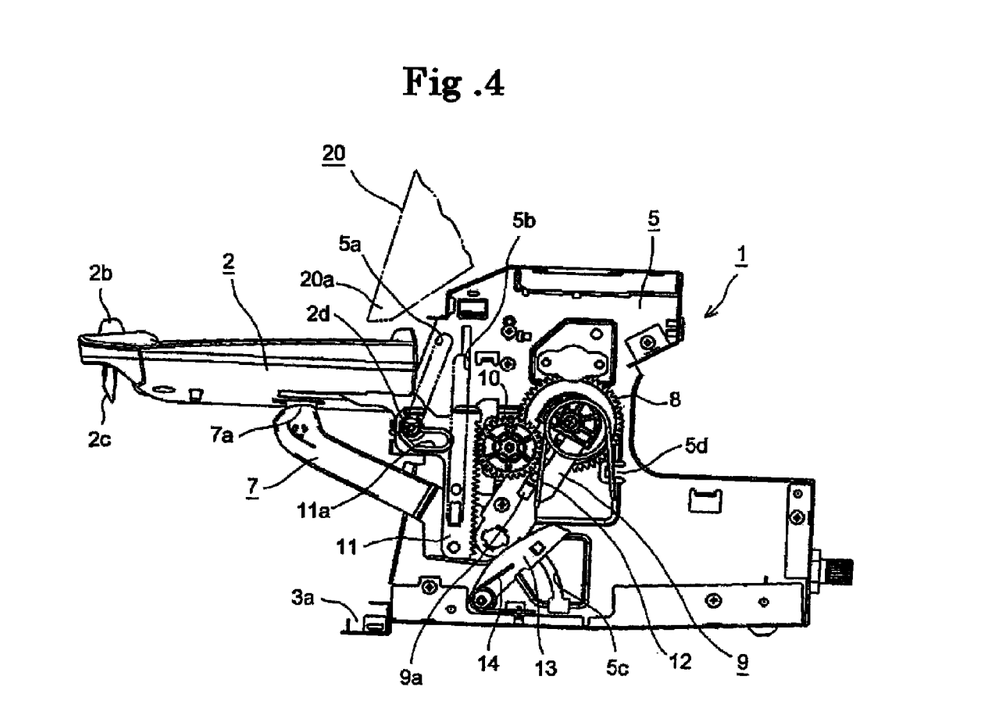
FIG. 4 is a diagram illustrating the internal structure of the front panel apparatus shown in FIG. 2 when in a fully-open state.

As shown in FIGS. 3 and 4, pivot support shafts 2d are provided on the left and right sides of the upper end of the display panel 2, and the display panel 2 is capable of opening by pivoting upward (clockwise, in FIG. 3) and closing by pivoting downward (counterclockwise, in FIG. 4), around the pivot support shafts 2d. Furthermore, the display panel 2 is supported by the chassis 5 via the power transmission mechanisms 4, which will be discussed later. To be more specific, the central area on both sides of the rear surface of the display panel 2 is supported by biasing levers 7 of the power transmission mechanisms 4, and the pivot support shafts 2d on the upper end of the display panel 2 are supported by rack members 11 of the power transmission mechanisms 4.

The display panel 2 is opened by the power transmission mechanisms 4, but the display panel 2 is closed manually. When the display panel 2 is in the fully-closed state shown in FIGS. 1 and 3, the locking hook 2c is latched with the locking cavity 3a, and thus the display panel 2 is kept from being opened and kept (locked) in the fully-closed state. Then, when the operational button 2b is pushed while the display panel 2 is in the fully-closed state, the locking hook 2c separates from the locking cavity 3a, thus unlocking the display panel 2; and the power transmission mechanisms 4 cause the display panel 2 to pivot in the opening direction. In other words, the operational button 2b, the locking hook 2c, and the locking cavity 3a provide a lock mechanism 6, and the display panel 2 is locked in or unlocked from the fully-closed state by this lock mechanism 6.

As shown in FIGS. 3 and 4, first guide grooves 5a and second guide grooves 5b extending in a straight line, and third guide grooves 5c extending in a curved line, are provided in the chassis 5. The first guide grooves 5a are slightly sloped in the vertical direction, and the pivot support shafts 2d of the display panel 2 are inserted into the first guide grooves 5a in a slidable state. The second guide grooves 5b extend in the vertical direction, and guide pins of the rack members 11 in the power transmission mechanisms 4 are inserted into the second guide grooves 5b in a slidable state. Finally, guide pins of support levers 13 in the power transmission mechanisms 4 are inserted into the third guide grooves 5c in a slidable state.

Each of the power transmission mechanisms 4 primarily includes: the biasing lever 7, one end 7a of which is linked to the rear surface of the display panel 2 so as to be capable of pivoting, and which can advance and recede; a driving gear 8 axially supported by the chassis 5 so as to be capable of rotation; a pivot lever 9, protruding from the driving gear 8, and linked to the other end 7b of the biasing lever 7 so as to be capable of pivoting; an intermediate gear 10, axially supported by the chassis 5 so as to be capable of rotation, that interlocks with the driving gear 8; the rack member 11, capable of ascending and descending, that interlocks with the intermediate gear 10 and supports the pivot support shaft 2d of the display panel 2; a driving spring 12 that elastically biases the driving gear 8 in the clockwise direction shown in FIG. 3 via the pivot lever 9; a support lever 13, axially supported by the chassis 5 so as to be capable of pivoting, that supports the other end 7b of the biasing lever 7; and a support spring 14 that elastically biases the support lever 13 in the counterclockwise direction shown in FIG. 3.

Each driving spring 12 is a torsion spring, and as shown in FIG. 4, one arm of the driving spring 12 is anchored to a spring receiving portion 5d in the chassis 5, whereas the other arm of the driving spring 12 is anchored to a spring receiving portion 9a in the pivot lever 9. When the driving gears 8 and the pivot levers 9 pivot in the clockwise direction shown in FIG. 3 due to the biasing force of the driving springs 12, the biasing levers 7 are driven by the pivot levers 9 and advance in the upward diagonal direction; thus the display panel 2, which is linked to the ends 7a of the biasing levers 7, is opened. However, when the locking hook 2c is latched with the locking cavity 3a, against the forward force of the biasing levers 7, the display panel 2 is prevented from opening and thus locked in the fully-closed state. Meanwhile, when the display panel 2 is in the fully-open state and is then closed by being manually rotated in the counterclockwise direction shown in FIG. 4, the biasing levers 7 are driven by the display panel 2 and withdraw in the downward diagonal direction; therefore, the driving gears 8 and the pivot levers 9 are driven by the biasing levers 7 and rotate in the counterclockwise direction shown in FIG. 4, and the driving springs 12 are compressed as a result.

As mentioned earlier, the guide pins (not shown) of the support levers 13 are inserted in a slidable state into the arc-shaped third guide grooves 5c, and the support levers 13, which are axially supported by the chassis 5, are capable of moving along the third guide grooves 5c. The support levers 13 are elastically biased in the counterclockwise direction shown in FIG. 3 by the support springs 14, and the other ends 7b of the biasing levers 7 are supported by the support levers 13 in a slidable state. When the biasing levers 7 advance in the upward diagonal direction and the display panel 2 is opened, the support levers 13 pivot in the counterclockwise direction shown in FIG. 3 while supporting the other ends 7b of the biasing levers 7. Meanwhile, when the display panel 2 is closed and the biasing levers 7 withdraw in the diagonal downward direction as a result, the support levers 13 pivot in the clockwise direction shown in FIG. 4, while supporting the other ends 7b of the biasing levers 7. Although the biasing force of the support springs 14 does help the advance of the biasing levers 7 to a slight degree, the driving force that advances the biasing levers 7 is generated almost entirely by the biasing force of the driving springs 12.

The intermediate gears 10 and the driving gears 8 interlock, and thus when the driving gears 8 rotate in the forward or backward direction, the intermediate gears 10 are rotationally driven in the opposite direction as the driving gears 8. Furthermore, the intermediate gears 10 interlock with teeth in the rack members 11, and the rack members 11 have guide pins capable of moving vertically while being guided by the second guide grooves 5b. For this reason, when the driving gears 8 rotate, the rack members 11 are driven by the intermediate gears 10, and ascend or descend in the vertical direction as a result. In other words, when the display panel 2 is opened, the driving gears 8 rotate in the clockwise direction shown in FIG. 3, and as a result, the intermediate gears 10 rotate in the counterclockwise direction shown in FIG. 3, thus causing the rack members 11 to descend. Meanwhile, when the display panel 2 is closed, the driving gears 8 rotate in the counterclockwise direction shown in FIG. 4, and as a result, the intermediate gears 10 rotate in the clockwise direction shown in FIG. 4, thus causing the rack members 11 to ascend.

Guide holes 11a, curved in a boomerang shape, are provided in the vicinity of the upper ends of the rack members 11, and the pivot support shafts 2d of the display panel 2 pass through these guide holes 11a and are supported by the rack members 11. Accordingly, these rack members 11 function as support point ascending/descending members that are driven by the intermediate gears 10 and cause the pivot support shafts 2d to ascend or descend. Although the pivot support shafts 2d of the display panel 2 are slidable along the guide holes 11a, the pivot support shafts 2d are also inserted into the first guide grooves 5a in a slidable state, and thus the position of the pivot support shafts 2d is determined only based on the height position of the rack members 11. In other words, when the rack members 11 descend, the pivot support shafts 2d descend along the first guide grooves 5a while being driven by the rack members 11; conversely, when the rack members 11 ascend, the pivot support shafts 2d ascend along the first guide grooves 5a while being driven by the rack members 11. Here, the pivot support shafts 2d move along the first guide grooves 5a while sliding within the guide holes 11a, and thus the ascending/descending of the rack members 11 and the ascending/descending of the pivot support shafts 2d can be linked to each other in a smooth manner.

Next, the operation of the front panel apparatus 1 configured in this manner will be described. As shown in FIG. 1 and FIG. 3, the front panel apparatus 1 is kept in an essentially upright attitude when in the fully-closed state that covers the storage area 3. Because the front panel apparatus 1 opposes an occupant's line of sight from a downward diagonal position, the display screen 2a of the display panel 2 is easily visible to the occupant. Furthermore, when in the fully-closed state, the display panel 2 is prevented from opening by the lock mechanism 6, and thus there is no risk that the display panel 2 will open unintentionally.

When the display panel 2 is to be transitioned from the fully-closed state to the fully-open state, the user pushes the operational button 2b to separate the locking hook 2c from the locking cavity 3a, thereby unlocking the display panel 2. As a result, the driving gears 8 and pivot levers 9 rotate in the clockwise direction shown in FIG. 3 due to the biasing force of the driving springs 12, and the biasing levers 7 are driven by the pivot levers 9 and advance in the upward diagonal direction; therefore, the display panel 2 is driven by the biasing levers 7 and begins to open. Furthermore, the intermediate gears 10, which are interlocked with the driving gears 8, rotate in the counterclockwise direction shown in FIG. 3, thus causing the rack members 11 to descend; as a result, the pivot support shafts 2d of the display panel 2 also descend along the first guide grooves 5a. Because the display panel 2 is opened while causing the pivot support shafts 2d to descend in this manner, the pivot support shafts 2d gradually separate from an adjacent portion 20a in the surrounding member 20, which is in the vicinity of the top of the display panel 2; accordingly, the display panel 2 can be rotated to a fully-open position without risk of interference between the display panel 2 and the adjacent portion 20a.

FIGS. 2 and 4 illustrate a state in which the display panel 2 is fully open, and in this fully-open state, the biasing levers 7 are in a forwardmost position. Furthermore, when the display panel 2 is in this fully-open state, the pivot angle of the pivot levers 9 and the support levers 13 is at a maximum, and the rack members 11 are also in a lowermost position. In the case where the display panel 2 in the fully-open state is to be closed, the user can simply push the display panel 2 down, manually, in the closing direction. In other words, when the display panel 2 is pivoted in the closing direction and the locking hook 2c enters into the locking cavity 3a, the locking hook 2c is latched with the locking cavity 3a, and thus the display panel 2 is kept (locked) in the fully-closed state shown in FIGS. 1 and 3. Meanwhile, when the display panel 2 closes, it drives the biasing levers 7 and causes the biasing levers 7 to withdraw in the downward diagonal direction. Accordingly, the driving gears 8 are rotationally driven in the counterclockwise direction shown in FIG. 4 via the pivot levers 9; as a result, the driving springs 12 are compressed, and the support levers 13 are rotationally driven in the clockwise shown in FIG. 4, thus compressing the support springs 14 as well. Furthermore, the intermediate gears 10, which are interlocked with the driving gears 8, rotate in the clockwise direction shown in FIG. 4, thus causing the rack members 11 to ascend; as a result, the pivot support shafts 2d of the display panel 2 also ascend along the first guide grooves 5a. In this case, the pivot support shafts 2d gradually approach the adjacent portion 20a of the surrounding member 20 from a position that is sufficiently distanced therefrom, thus making it possible to pivot the display panel 2 to a fully-closed position without risk of interference between the display panel 2 and the adjacent portion 20a.

As described thus far, according to the front panel apparatus 1 of the present embodiment, the rotation of the driving gears 8 in one direction and the advancement of the biasing levers 7 can be linked to the opening of the display panel 2, and the intermediate gears 10, which are rotationally driven by the driving gears 8, drive the rack members 11, thereby making it possible to move (lower) the pivot support shafts 2d of the display panel 2 away from the adjacent portion 20a of the surrounding member 20. Accordingly, when the display panel 2 in the fully-closed state is opened by being pivoted toward the fully-open state, there is no risk of the end of the display panel 2 on the side of the pivot support shafts 2d (that is, the upper end) interfering with the adjacent portion 20a. Furthermore, there is also no risk of the end of the display panel 2 on the side of the pivot support shafts 2d interfering with the adjacent portion 20a of the surrounding member 20 when the display panel 2 returns to the original fully-closed state from the fully-open state. Accordingly, the gap between the end of the display panel 2 on the side of the pivot support shafts 2d and the adjacent portion 20a of the surrounding member 20 when the display panel 2 is in the fully-closed state can be set to be narrow (see FIG. 1). As a result, the gap is not apparent to an occupant when viewed from the upward diagonal direction, thus improving the external appearance, and the design of the surrounding member 20 adjacent to the display panel 2 is not restricted, thus making it possible to improve the aesthetic qualities of the car's interior décor. Furthermore, a motor is not necessary to realize the opening and closing operations of the display panel 2, which ensures that the structure of the power transmission mechanisms 4 is not complicated; this makes it possible to keep a low manufacturing cost for the front panel apparatus 1.

In addition, according to the front panel apparatus 1 of the present embodiment, the biasing levers 7 can be advanced by the driving springs 12 elastically biasing the driving gears 8; and the lock mechanism 6, which is capable of holding the display panel 2 in the fully-closed state against the forward force of the biasing levers 7, is provided. Thus, when the user unlocks the lock mechanism 6, the display panel 2 can be pivoted in the opening direction as a result of the biasing force of the driving springs 12. Accordingly, the display panel 2 can be opened automatically, rather than manually, even with a low-cost configuration that lacks a motor, and thus the front panel apparatus has an improved operability. Furthermore, in the front panel apparatus 1, the pivot levers 9 that are integrated with the driving gears 8 are linked with the ends 7b of the biasing levers 7 so as to be capable of pivoting, and thus the rotation of the driving gears 8 and the advancing/withdrawing of the biasing levers 7 can be linked without the driving gears 8 having a significantly large diameter. This makes it easier to achieve a smaller size for the front panel apparatus 1.

Although the opening of the display panel 2 is carried out automatically using the biasing force of the driving springs 12 in the present embodiment, it should be noted that it is possible to configure the display panel 2 so that both the closing and opening thereof are carried out manually, in which case the driving springs 12 may be omitted. Meanwhile, although a configuration in which the support point ascending/descending member is not the rack members 11 is possible, if the rack members 11 that interlock with the intermediate gears 10 are supported by the pivot support shafts 2d of the display panel 2, the rack members 11 can be raised and lowered with precision by the rotation of the intermediate gears 10. Accordingly, it is easy to raise and lower the pivot support shafts 2d along desired paths in tandem with the opening and closing operations of the display panel 2.

The aforementioned embodiment describes a front panel apparatus in which the pivot support shafts 2d are provided on the upper end of the display panel 2, and thus, when the display panel 2 opens, it is pivoted upward. However, the same effects can be achieved by applying the present invention to a front panel apparatus in which pivot support shafts are provided on the lower end of the display panel, and thus, when a display panel opens, it is pivoted downward. In other words, in the case where the front panel apparatus is installed higher than the user's line of sight and the pivot support shafts are provided on the lower end of the display panel, a wide gap between the lower end of the display panel and a surrounding member below the lower end may be apparent in a conventional apparatus. Accordingly, in this case, employing a power transmission mechanism capable of causing the pivot support shafts to ascend in tandem with the opening of the display panel makes it possible to avoid interference between the lower end of the display panel and the surrounding member adjacent thereto; this in turn makes it possible to set the gap between the two to be narrow. Note that each power transmission mechanism in this case has a structure in which the structure of the power transmission mechanism 4 shown in FIG. 3 and FIG. 4 is inverted vertically.

Next, a front panel apparatus according to a second embodiment of the present invention will be described with reference to FIGS. 5 and 6. Note that, in FIGS. 5 and 6, the front panel apparatus is illustrated in a simplified manner, and the elements that correspond to those shown in FIGS. 1 through 4 are given the same reference numerals.

Figure 5:
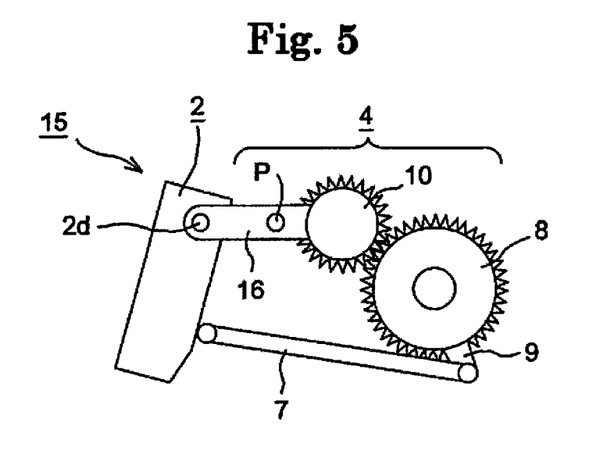
FIG. 5 is a diagram of a front panel apparatus according to a second embodiment of the present invention, illustrating a state in which a display panel is closed.
Figure 6:
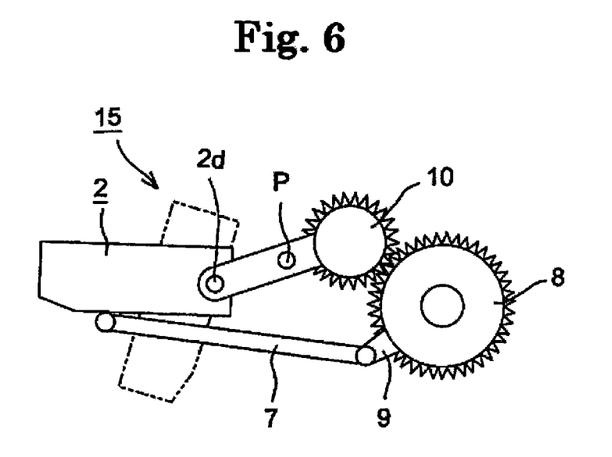
FIG. 6 is a diagram illustrating a state in which the display panel shown in FIG. 5 is open.

A front panel apparatus 15 shown in FIGS. 5 and 6 mainly differs from the front panel apparatus 1 illustrated in the aforementioned first embodiment in that pivoting levers 16 are used as the support point ascending/descending members instead of the rack members. These pivoting levers 16 are axially supported by a chassis (not shown) at an axial center P so as to be capable of pivoting, and the base ends thereof are integrated with the intermediate gears 10. The tips of the pivoting levers 16 on the side opposite to the intermediate gears 10 are linked to the pivot support shafts 2d of the display panel 2 so as to be capable of rotation.

The operations of this front panel apparatus 15 are basically the same as in the first embodiment (the front panel apparatus 1). In other words, when the display panel 2 is in a fully-closed state as shown in FIG. 5 and the display panel 2 is unlocked, the driving gears 8 are rotated in the clockwise direction shown in FIG. 5 by the biasing force of driving springs (not shown), the biasing levers 7 advance through the pivot levers 9 and causes the display panel 2 to begin to open, and the driving gears 8 cause the intermediate gears 10 to rotate in the opposite direction (the counterclockwise direction). Accordingly, the pivoting levers 16, which are driven by the intermediate gears 10, pivot in the counterclockwise direction around the axial center P, thus causing the pivot support shafts 2d to descend, which in turn causes the display panel 2 to open in the fully-open direction. Meanwhile, when the display panel 2 is in the fully-open state shown in FIG. 6 and the user manually pivots the display panel 2 in the closing direction, the biasing levers 7 withdraw and the driving gears 8 rotate in the counterclockwise direction shown in FIG. 6. As a result, the intermediate gears 10 rotate in a clockwise direction shown in FIG. 6, the pivoting levers 16, which are driven by the intermediate gears 10, pivot in the clockwise direction around the axial center P, thus causing the pivot support shafts 2d to ascend, and the display panel 2 closes in the fully-closed direction. The pivot support shafts 2d of the display panel 2 can thus be caused to ascend/descend through the pivoting of the pivoting levers 16 that are integral with the intermediate gears 10; this makes it possible to realize a reduction in the number of components in the front panel apparatus 15 and a simplified structure for the front panel apparatus 15.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A front panel apparatus, comprising:
a display panel capable of pivoting in opening and closing directions about pivot support points that are disposed at a first location on the display panel;
biasing levers contacting the display panel at a second location on the display panel that is spaced apart from the first location and configured to advance and withdraw in tandem with opening and closing operations of said display panel;
driving gears that rotate in tandem with the advancing and receding of said biasing levers;
intermediate gears that rotate by interlocking with said corresponding driving gears; and
support point ascending/descending members that support corresponding pivot support points of said display panel so as to be capable of ascending and descending,
wherein said support point ascending/descending members are linked to said corresponding intermediate gears, said driving gears rotate in tandem with the opening and closing operations of said display panel, and said intermediate gears rotate in tandem with said driving gears, and thus said intermediate gears drive said support point ascending/descending members, thereby causing said pivot support points to ascend and descend.

2. The front panel apparatus according to claim 1, further comprising:
spring members that elastically bias said corresponding biasing levers in the forward direction; and
a lock mechanism that locks said display panel in a closed state against the forward force of said biasing levers and unlocks said display panel.

3. The front panel apparatus according to claim 2, wherein a pivot lever is provided for each of said driving gears, and ends of said biasing levers on the side opposite to said display panel are linked to said corresponding pivot levers in a rotatable state.

4. The front panel apparatus according to claim 1, wherein said pivot support points are provided on an upper end of said display panel, and said support point ascending/descending members cause said pivot support points to descend in tandem with the opening of said display panel.

5. The front panel apparatus according to claim 1, wherein said support point ascending/descending members are rack members capable of ascending and descending by interlocking with said corresponding intermediate gears, and said rack members are linked to said corresponding pivot support points.

6. The front panel apparatus according to claim 1, wherein said support point ascending/descending members are pivoting levers that are integrated with said corresponding intermediate gears and are capable of pivoting, and ends of said pivoting levers on the opposite side as said intermediate gears are linked to said corresponding pivot support points.

7. A front panel apparatus, comprising:
a display panel capable of pivoting in opening and closing directions relative to a surrounding member, where the display panel pivots about pivot support points that are disposed at a first location on the display panel;
biasing levers contacting the display panel at a second location on the display panel that is spaced apart from the first location and configured to advance and withdraw in tandem with opening and closing operations of said display panel;
support point ascending/descending members that support corresponding pivot support points of said display panel so as to be capable of ascending and descending, wherein said support point ascending/descending members ascend and descend in tandem with opening and closing of said display panel to avoid interference between said display panel and said surrounding member;
spring members that elastically bias said display panel in the forward direction; and
a lock mechanism that locks said display panel in a closed state against the forward force of said spring members and unlocks said display panel.

8. The front panel apparatus according to claim 7, wherein said pivot support points are provided on an upper end of said display panel, and said support point ascending/descending members cause said pivot support points to descend in tandem with the opening of said display panel.

9. The front panel apparatus according to claim 7, wherein said pivot support points are provided on a lower end of said display panel, and said support point ascending/descending members cause said pivot support points to ascend in tandem with the opening of said display panel.

10. The front panel apparatus according to claim 7, wherein said support point ascending/descending members are rack members capable of ascending and descending.

11. A front panel apparatus, comprising:
a display panel capable of pivoting in opening and closing directions relative to a surrounding member, where the display panel pivots about pivot support points that are disposed at a first location on the display panel;
biasing levers contacting the display panel at a second location on the display panel that is spaced apart from the first location and configured to advance and withdraw in tandem with opening and closing operations of said display panel;
support point ascending/descending members that support corresponding pivot support points of said display panel so as to be capable of ascending and descending, wherein said support point ascending/descending members ascend and descend in tandem with opening and closing of said display panel to avoid interference between said display panel and said surrounding member;
wherein said pivot support points are provided on an upper end of said display panel, and said support point ascending/descending members cause said pivot support points to descend in tandem with the opening of said display panel.

12. The front panel apparatus according to claim 11, wherein said support point ascending/descending members are rack members capable of ascending and descending.

* * * * *